(12) United States Patent
Tomobuchi et al.

(10) Patent No.: US 8,562,468 B2
(45) Date of Patent: Oct. 22, 2013

(54) PULLEY FOR USE WITH TOOTHED BELT

(75) Inventors: Masato Tomobuchi, Osaka (JP);
Masaru Kanamori, Osaka (JP)

(73) Assignee: Tsubakimoto Chain Co., Osaka (JP)

( * ) Notice: Subject to any disclaimer, the term of this patent is extended or adjusted under 35 U.S.C. 154(b) by 712 days.

(21) Appl. No.: 12/578,695

(22) Filed: Oct. 14, 2009

(65) Prior Publication Data

US 2010/0105509 A1    Apr. 29, 2010

(30) Foreign Application Priority Data

Oct. 23, 2008 (JP) ................................. 2008-272664

(51) Int. Cl.
*F16H 7/02* (2006.01)

(52) U.S. Cl.
USPC ........................................................ 474/153

(58) Field of Classification Search
USPC ........................ 474/152, 153, 157, 188, 205
See application file for complete search history.

(56) References Cited

U.S. PATENT DOCUMENTS

| | | | |
|---|---|---|---|
| 2,923,166 A * | 2/1960 | Brindley et al. | 474/152 |
| 4,545,778 A | 10/1985 | Koivula | |
| 4,571,224 A * | 2/1986 | Arinaga | 474/153 |
| 4,634,410 A | 1/1987 | Tangorra | |
| 5,013,286 A | 5/1991 | Breher | |
| 5,417,617 A * | 5/1995 | Milton | 474/93 |
| 6,099,427 A | 8/2000 | Brown | |
| 6,575,862 B2 | 6/2003 | Miyaji | |
| 6,837,357 B2 | 1/2005 | Peter | |
| 2003/0195072 A1 * | 10/2003 | Redmond | 474/161 |
| 2005/0096169 A1 | 5/2005 | Reichard, II | |
| 2007/0105674 A1 * | 5/2007 | Hogn | 474/152 |
| 2007/0182219 A1 | 8/2007 | Mori | |
| 2009/0093328 A1 | 4/2009 | Dickinger | |
| 2009/0098966 A1 * | 4/2009 | Kamada | 474/160 |

FOREIGN PATENT DOCUMENTS

| | | |
|---|---|---|
| JP | S44-11551 | 11/1965 |
| JP | 57-095713 | 4/1982 |
| JP | 62-87251 | 6/1987 |
| JP | 01-143462 | 3/1988 |
| JP | S63-40082 | 3/1988 |
| JP | S64-055471 | 2/1989 |
| JP | 2001-276939 | 10/2001 |
| JP | 2005351425 | 12/2005 |

OTHER PUBLICATIONS

U.S. Appl. No. 12/893,543, mailed Nov. 29, 2012, Restriction Requirement.
U.S. Appl. No. 12/893,543, mailed Jan. 22, 2013, Non-Final Office Action

* cited by examiner

*Primary Examiner* — William E Dondero
*Assistant Examiner* — Robert T Reese
(74) *Attorney, Agent, or Firm* — Workman Nydegger

(57) ABSTRACT

There is provided a pulley for use with a toothed belt capable of reducing the noise generated when the pulley engages with the toothed belt, while reducing the manufacturing costs and time used to manufacture the pulley. The pulley includes a disk whose inner circumference is fitly attached to a rotary shaft. The outer circumference of the pulley has teeth to be engaged with the toothed belt and flanges erected on both sides of the tooth, wherein the flanges have a plurality of through holes that penetrate through the flanges in a direction of the rotary shaft.

19 Claims, 8 Drawing Sheets

PULLEY FOR USE WITH TOOTHED BELT

CROSS REFERENCE TO RELATED APPLICATIONS

This application claims the foreign priority benefit under Title 35, United States Code, §119 (a)-(d) of Japanese Patent Application No. 2008-272664, filed on Oct. 23, 2008 in the Japanese Patent Office, the disclosure of which is herein incorporated by reference in its entirety.

BACKGROUND OF THE INVENTION

1. Field of the Invention

The present invention relates to a pulley for use with a toothed belt. More particularly, the present invention relates to a pulley for use with a tooth belt which is capable of conveying a rotary movement by engaging with the toothed belt.

2. Description of Related Art

One pulley 500 currently known in the art for use with a toothed belt is shown in FIG. 6. The pulley has teeth 501 provided around an outer circumference thereof which engage with the toothed belt and flanges 550 erected on both lateral sides of the toothed belt. The flanges 550 suppress the toothed belt from wobbling in a width direction thereof so as to convey a stable rotary movement. One problem with this configuration, however, is that air can become compressed between the toothed belt and pulley when the toothed belt engages with the teeth 501. As the air is compressed, the air discharges through the small gap between the sides of the toothed belt and flanges 550, resulting in very large pneumatic and explosive sounds.

One method for reducing this noise is described in Japanese Patent Application 2007-276939, where the compression noise is reduced by letting air out before the pulley engages with the toothed belt, as described on page 4 of the application and shown in FIG. 3. As shown in FIGS. 7 through 9, this known pulley 600 reduces the noise using a series of incisions 602 formed on the teeth 601 so as to channel air from the incisions 602 to dedendums 603 before the pulley 600 engages with the toothed belt 610 and to reduce the noise otherwise generated when the compressed air leaks out of the gap, as described in pages 3-5 and FIGS. 1-3 of Japanese Utility Model Application No. Sho. 62-87251 gazette.

One problem with this configuration, however, is that the manufacturing cost sharply increase due to the additional manufacturing processes required to form the incisions 602. Additionally, production efficiency decreases. Furthermore, the known pulley 600 also has a low noise reducing effect because the amount of air released through the incisions 602 because a depth of the incisions 602 is limited by a height of the teeth 601. Furthermore, noise is still generated as air is compressed through the incisions 602

Accordingly, the present invention aims at solving the problems of the prior art technologies described above by providing a pulley for use with a toothed belt which is capable of reducing noise while reducing the manufacturing costs, increasing production efficiency, which is capable of stably conveying a rotary movement by suppressing the toothed belt from wobbling in the width direction.

BRIEF SUMMARY OF THE INVENTION

One aspect of the invention is a pulley for use with a toothed belt. The pulley includes a disk whose inner circumference is formed so as to fitly attach to a rotary shaft and whose outer circumference is formed with teeth for engaging the toothed belt, the outer circumference also includes flanges erected on each lateral sides of the teeth, wherein the flanges have a plurality of through holes formed therein extending in a direction of the rotary shaft.

As described more fully below, the pulley claimed herein offers various advantages over the pulleys currently known in the art. More particularly, the pulley described herein is capable of stably conveying the rotary movement between the pulley and the toothed belt because the toothed belt is suppressed from wobbling in the width direction by the flanges. Further, the invention reduces the loud sounds otherwise generated when the compressed air formed when the pulley engages with the toothed belt discharges through the through holes. Further, the manufacturing process is simplified and the manufacturing costs are reduced while improving the production efficiency by shortening the manufacturing time.

BRIEF DESCRIPTION OF THE DRAWINGS

FIGS. 4 and 4A are enlarged side views of a flange according to a third embodiment of the invention;

BEST MODE FOR CARRYING OUT THE INVENTION

While the invention will be explained in detail below with reference to preferred embodiments, the invention may be modified without departing from the scope of the following claims. As described more fully below, aspects of the invention provide various effects, including reduced noise, reduced manufacturing cost, simplified manufacturing processes, improved production efficiency by shortening the manufacturing time, while stably conveying rotary movement by suppressing the toothed belt from wobbling in the width direction.

The pulley of the invention may be made of any material such as metal, e.g., iron, plastics and ceramics. The flange may be formed in a body with the disk or may be formed separately from the disk and subsequently fitly attached to the disk. Or, one of the flanges may be formed together with the disk while the other flange may be formed separately from the disk and subsequently attached to the disk.

The through holes formed through the flanges of the pulley for use with a toothed belt of the invention may be formed into any shape including circular, polygonal, or the like. Additionally, the holes may all have the same shape or size, or may have different sizes and shapes. Further, the through holes may be formed through both of the two flanges at locations corresponding to all of the tips of the teeth or may be formed only through one flange.

The flange may be fitly attached to the disk of the pulley for use with a toothed belt of the invention by any means such as tight fitting, e.g., press-fitting and thermal insertion, or may be fixed by bolts and nuts.

When the disk of the pulley for use with a toothed belt of the invention is divided into a plurality of members, it may be divided into two parts, three parts, or more. Additionally, a gap retainer of the pulley for use with a toothed belt of the invention may be made of metal such as iron or may be made of any material such as plastics, ceramics, rubber and the like.

The disk of the pulley for use with a toothed belt of the invention may be fitly attached to the rotary shaft by any means such as tight-fitting, press-fitting, thermal insertion, or may be fixed by bolts and nuts. Additionally, a keyway or spline may be also used. A gap retainer of the pulley for use with a toothed belt may be interposed and fixed between the disks or may be fitly attached to the rotary shaft in the same manner with the disks. Still more, the gap retainer may be rotably engaged with the disks by means of pins, concavo-convex parts and the like.

Embodiments of the Invention

Figure 1:
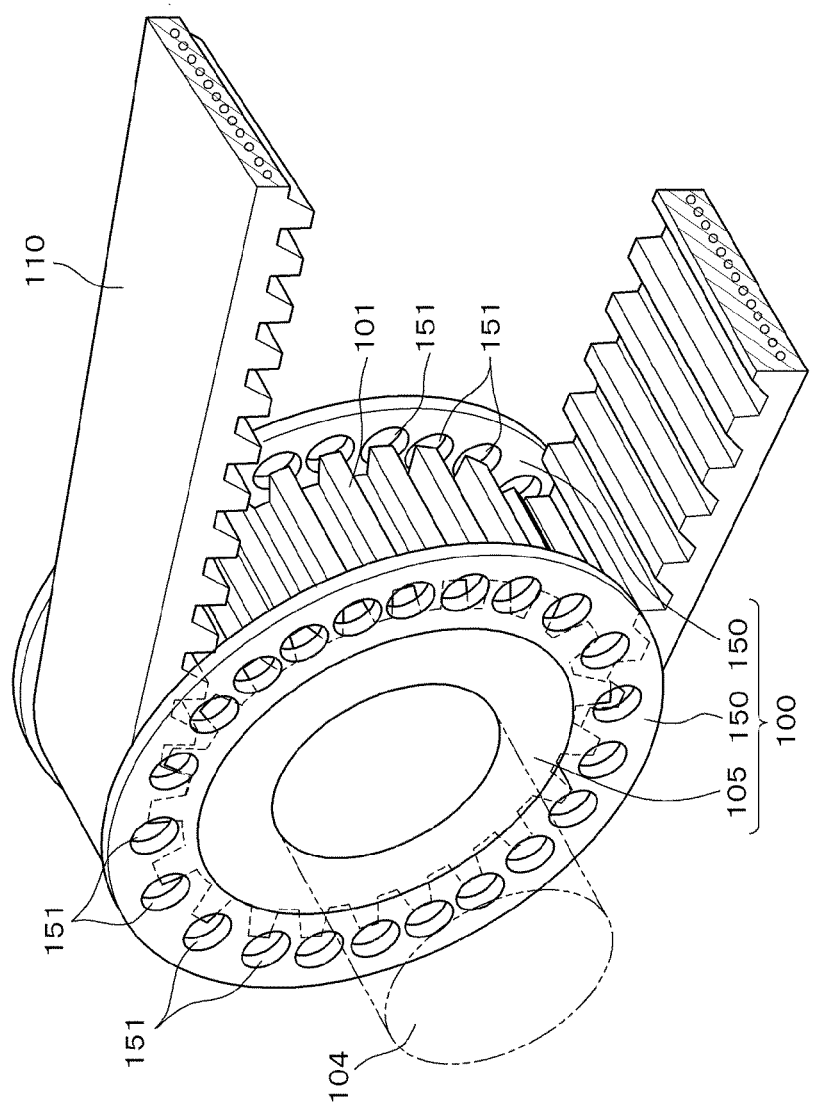
FIG. 1 is a perspective view showing a mode of use of a pulley for use with a toothed belt of embodiments of the invention.
Figure 2B:
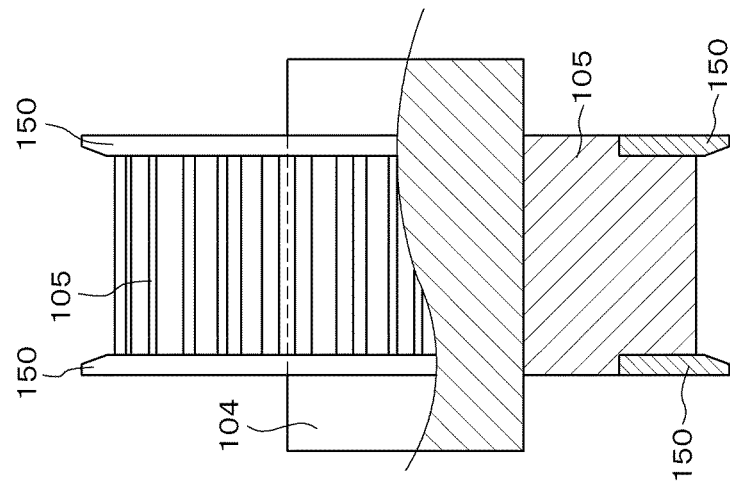
FIGS. 2A and 2B are front and section views of the pulley for use with a toothed belt according to a first embodiment of the invention.
Figure 2A:
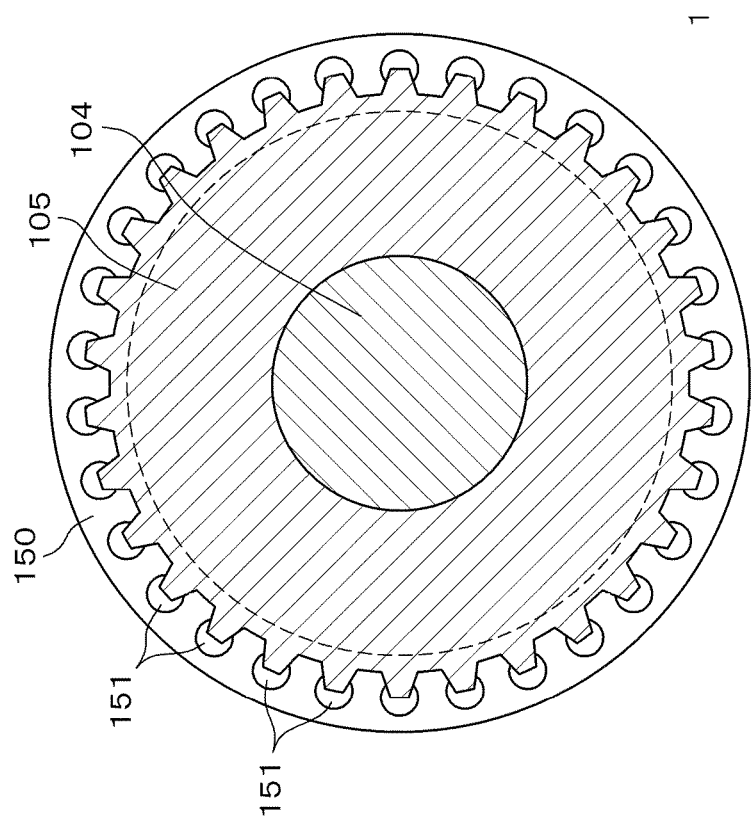
Figure 3:
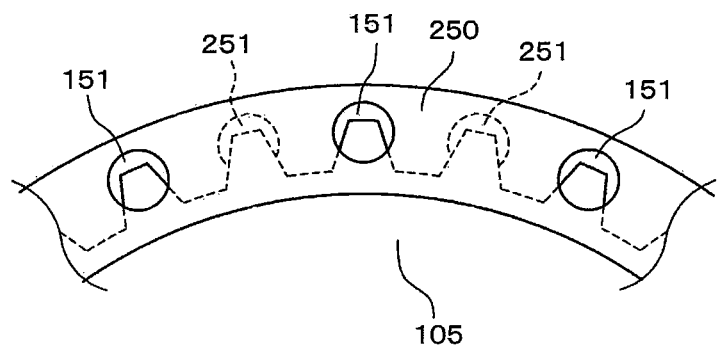
FIG. 3 is an enlarged side view of a flange according to a second embodiment of the invention.
Figure 4:
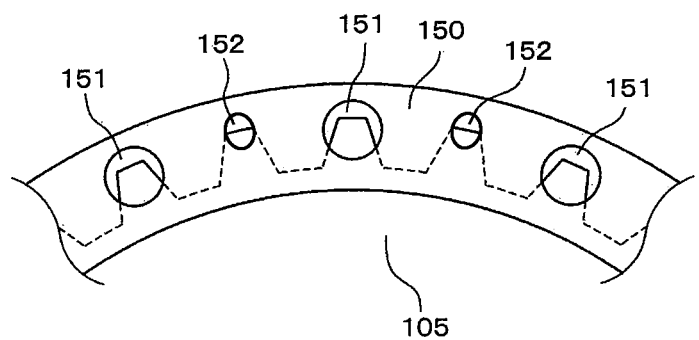
Figure 5B:
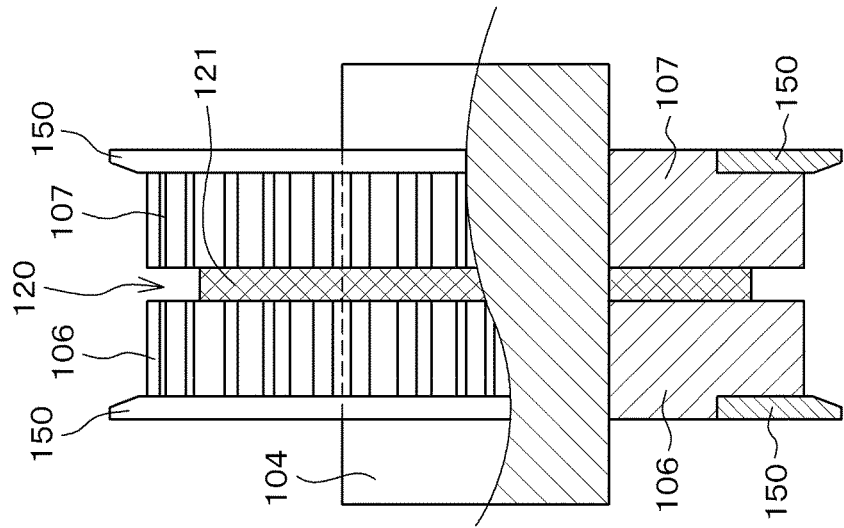
FIGS. 5A and 5B are front and section views of the pulley for use with a toothed belt according to a fourth embodiment of the invention.
Figure 5A:
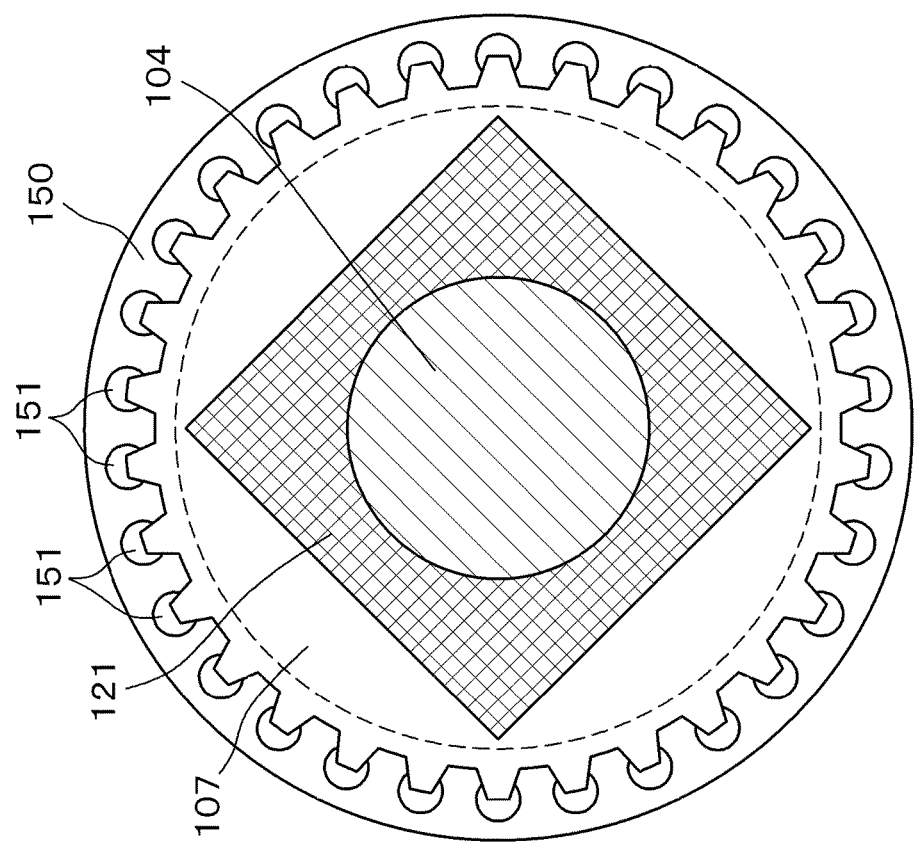
Figure 6:
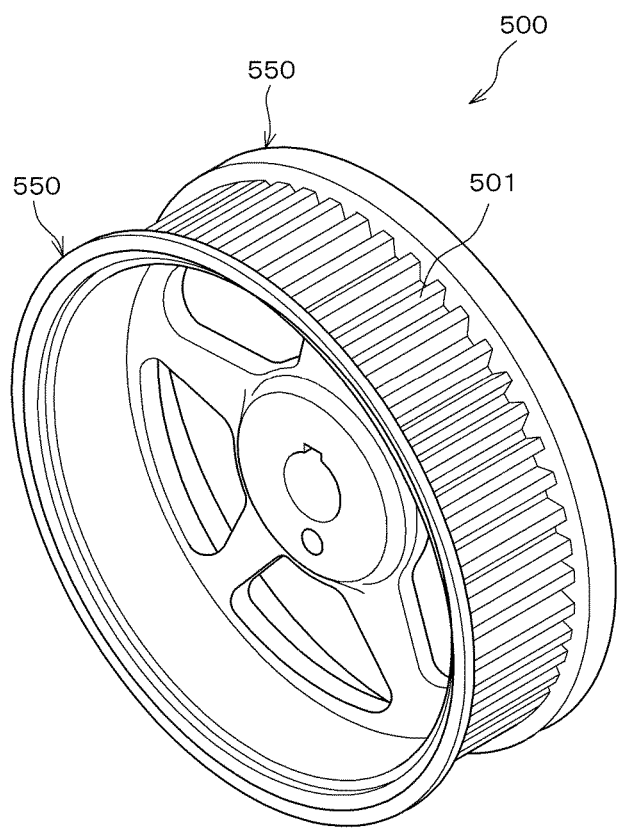
FIG. 6 is a perspective view of a prior art pulley for use with a toothed belt.
Figure 7:
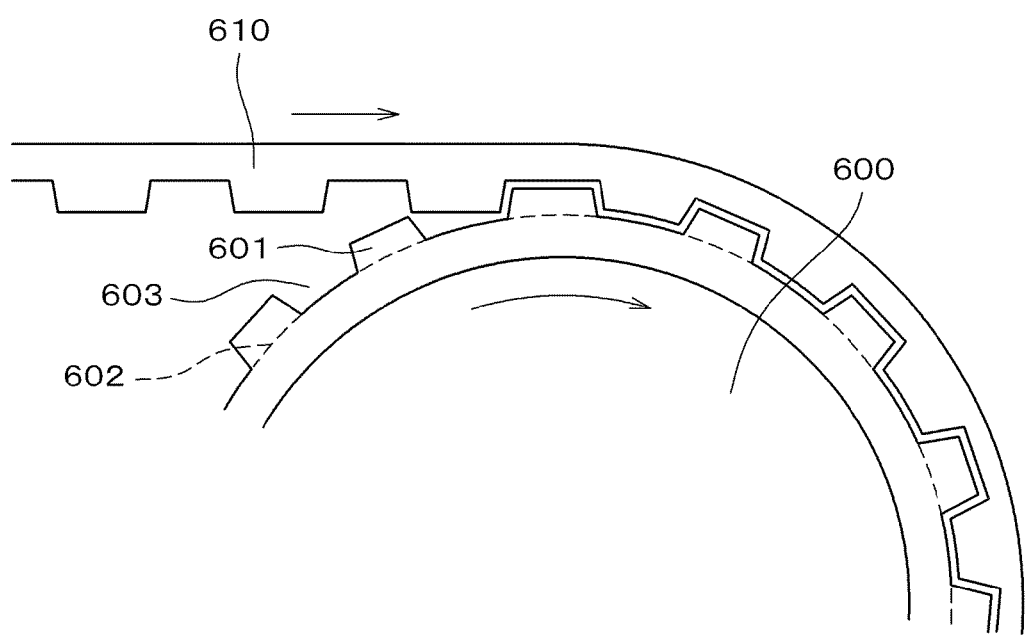
FIG. 7 is a side view of a mode of use of another prior art pulley for use with a toothed belt.
Figure 8:
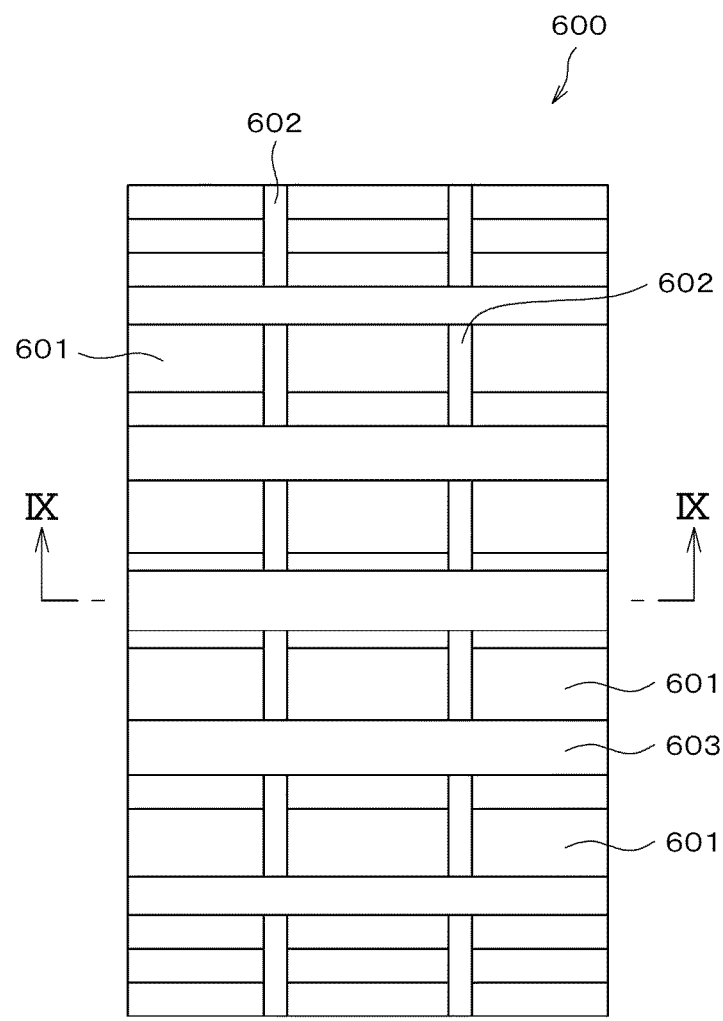
FIG. 8 is a front view of the other prior art pulley for use with a toothed belt.
Figure 9:
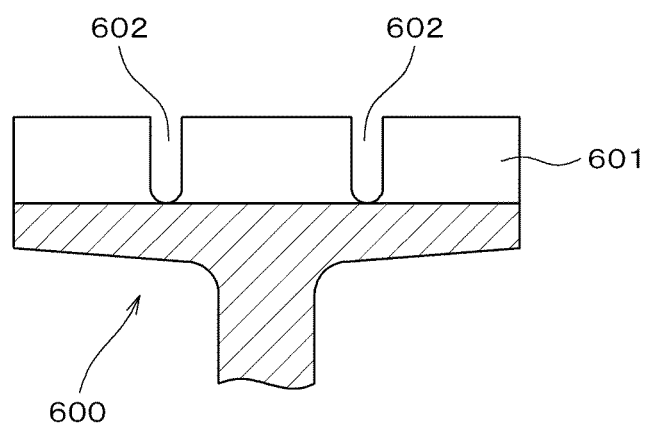
FIG. 9 is a section view of the other prior art pulley for use with a toothed belt.

Embodiments of the pulley for use with a toothed belt of the inventions will be explained below with reference to the drawings. FIG. 1 is a perspective view showing a mode of use of the pulley for use with a toothed belt of the embodiments of the invention, FIGS. 2A and 2B are front and section views of the pulley for use with a toothed belt according to a first embodiment of the invention, FIG. 3 is an enlarged side view of a flange according to a second embodiment of the invention, FIG. 4 is an enlarged side view of the a flange according to a third embodiment of the invention and FIGS. 5A and 5B are front and section views of the pulley for use with a toothed belt according to a fourth embodiment of the invention.

As shown in FIG. 1, the pulley for use with a toothed belt 100 of the embodiment of the invention has a disk 105 having flanges formed on both outer peripheral sides thereof. The pulley is fitly attached to a rotary shaft 104 and conveys a rotary movement by engaging its teeth 101 provided around an outer circumference of the disk 105 with a toothed belt 110.

As shown in FIGS. 1 and 2, the first embodiment of the pulley for use with a toothed belt 100 of the invention is arranged such that a plurality of through holes 151 is formed at positions in the flanges 150 at positions corresponding to tips of each tooth 101 in an axial direction of the rotary shaft 104. The teeth 101 engage the toothed belt 110, while t the disk 105 is fitly attached to the rotary shaft 104.

While the flanges 150 suppress wobbling of the toothed belt 110 in its width direction and permit a stable rotary movement, air compressed between the teeth and toothed belt when the teeth 101 of the disk 105 engage with the toothed belt 110 is discharged out of the through holes 151 provided at the positions of the flanges 150 corresponding to the tips of the teeth 101 of the disk 105. More particularly, the through holes 151 allow the air to move without increasing its pressure and flow rate. Accordingly, it is possible to reduce the noise otherwise generated when the air is compressed, as in the pulley configurations currently known in the art.

Further, because the air compressed when the teeth 101 of the disk 105 engage with the toothed belt 110 is compressed the most around the tips of the teeth 101 of the disk 105, it is possible to reduce the noise more effectively by providing the through holes 151 at the positions of the flanges 150 corresponding to the tips of the teeth 101 of the disk 105. Further, because the only additional manufacturing processes required are those necessary to machine the through holes 151 through the flanges 150, it becomes possible to cut a manufacturing cost as compared to other noise-reducing configurations, by simplifying a manufacturing process and to improve production efficiency by shortening the manufacturing time.

FIG. 3 illustrates a second embodiment of the pulley for use with a toothed belt 100 of the invention. As shown in FIG. 3, the pulley is arranged such that the through holes 151 and 251 formed through the flanges 150 and 250 on the both sides are disposed at positions in an alternating configuration, such that the flanges 150 and 250 on the both sides are fitly attached to the disk 105 so that the through holes 151 and 251 correspond alternately to the tips of the teeth 101 of the disk 105. The other arrangements are the same with those of the first embodiment.

One advantage of this configuration is the number of holes formed in the flanges 150 and 250 are reduced by half, so that it becomes possible to cut the manufacturing cost by simplifying the manufacturing process further and to improve the production efficiency by shortening the manufacturing time further.

FIG. 4 illustrates a third embodiment of the invention comprising a pulley for use with a toothed belt 100, wherein the through holes 151 and 152 formed through the flanges 150 on the both sides are formed so that they have different hole diameters. More particularly, the size of the holes alternate per tip of the tooth 101 of the disk 105. The other arrangement is the same with those of the first embodiment.

One advantage of this embodiment is that the different sized holes cause the air to be discharged from the holes at different speeds, causing discharge sounds at different frequencies to be ejected from the differently sized through holes 151 and 152 when the teeth 101 of the disk 105 engage with the toothed belt 110. Thus, the noise may be reduced further by dispersing the frequency components of the total sound generated when the pulley 100 is rotated in high speed.

The fourth embodiment of the invention, comprising a pulley for use with a toothed belt 100 is shown in FIGS. 5A and 5B. The pulley includes disks 106 and 107 having teeth 101 that engage with the toothed belt 110. Each of the disks 106 and 107 has a flange 150 through which the plurality of through holes 151 are formed at positions corresponding to the tips of the teeth 101 in the axial direction of the rotary shaft 104, which is fitly attached to the lateral sides of the respective disks 106 and 107. The two disks 106 and 107 are fitly attached to the rotary shaft 104 while interposing a gap retainer 121 there between so that a gap 120 is maintained between the two disks 106 and 107.

This arrangement reduces a flow of air in the belt width direction, prevents loud sounds from being generated and reduces the noise because a part of air compressed when the teeth 101 of the pulley for use with a toothed belt 100 engage with the toothed belt 110 is let out to a space formed by the gap 120 while suppressing an increase of pressure and flow rate.

In this configuration, the gap retainer 121 has a square outer circumference in shape and apexes of the outer circumference of the gap retainer 121 are parts where a diameter is largest, so that the gap retainer 121 can stably retain the two disks 106 and 107 in parallel. In addition to that, the gap retainer 121 can stably retain the two disks 106 and 107 in parallel while maintaining a volume of the space created by the gap 120 because the gap retainer 121 can increase the volume of the space created by the gap 120 more than configurations where the gap retainer has a constant diameter and whose outer circumference is circular in shape.

Because the outer circumference of the gap retainer 121 is not circular in shape, shapes of the space created in the gap 120 into which the air compressed when the teeth 101 of the two disks 106 and 107 engage with the toothed belt 110 escapes and flows are different per each engaging tooth 101. Accordingly, it becomes possible to differentiate frequency components of the sounds of the air passing through the holes 151 even if noise is still generated per each engaging tooth 101, so as to reduce the acoustic noise further by dispersing the frequency components of the total sound generated when the pulley is rotated in high speed.

Accordingly, aspects of the invention provides a pulley for use with a toothed belt capable of reducing the noise generated when the pulley engages the toothed belt while cutting the manufacturing cost, improving the production efficiency by shortening the manufacturing time, all while conveying a rotary movement stably by suppressing wobbling of the toothed belt in the width direction as described above.

Furthermore, while the fourth embodiment of the pulley for use with a toothed belt 100 of the invention has the two disks 106 and 107, the pulley may have three or more disks. When the pulley for use with a toothed belt 100 of the invention is composed of three or more disks, the pulley may have the gap retainers in the gaps interposed between all of the disks or may have the gap retainer in a part of the gaps. When the pulley has two or more gap retainers, the respective gap retainers may be same or different in shape.

Further, although the disks 105, 106 and 107 in the first through fourth embodiments of the pulley for use with a toothed belt 100 of the invention are simple disks with the same thicknesses and shape, other configurations may be used in association with the invention. For instance, disks may be used whose widths are widened only at parts around the outer circumference having the teeth 101 and around the inner circumference that is fitly attached to the rotary shaft 104, while the widths the remaining portions is reduced in the radial direction. Furthermore, configurations where a lightening part is provided in the axial direction at the intermediate part in the radial direction may also be used.

What is claimed is:

1. A pulley for use with a toothed belt, the pulley comprising:
    first and second disks, each of the disks comprising:
        an inner circumference formed so as to fitly attach to a rotary shaft;
        an outer circumference formed with teeth configured to engage the toothed belt, the outer circumference also includes a flange erected on a lateral side of the teeth, wherein the flanges has a plurality of through holes formed therein extending in a direction of the rotary shaft, the plurality of through holes having different sizes or different shapes, and wherein the first and second disks are attached to the rotary shaft such that a gap exists between the first and second disks; and
    a gap retainer positioned in the gap between the first and second disks.

2. The pulley according to claim 1, wherein for each of the first and second disks, the plurality of through holes are provided at positions corresponding to the positions of tips of the teeth formed in the respective outer circumference of the first and second disks.

3. The pulley according to claim 1, wherein said plurality of through holes are provided in an alternating configuration such that a first hole is formed in the flange of the first disk corresponding to the position of a tip of a tooth formed in the outer circumference of the first disk with no corresponding hole being formed in the flange of the second disk, while a second hole is formed in the flange of the second disk at a position corresponding to the tip of an adjacent tooth, with no corresponding second hole being formed in the flange of the first disk.

4. The pulley according to claim 1, wherein an inner circumference of said gap retainer is fitted to the rotary shaft and an outer circumference thereof is formed to be noncircular in shape.

5. The pulley according to claim 1, wherein the first and second disks have substantially the same diameter as each other.

6. The pulley according to claim 1, wherein the gap is configured and arranged such that, in use, the pulley receives the toothed belt between the respective flanges of the first and second disks.

7. A pulley for use with a toothed belt, the pulley comprising:
    a pair of disks, each disk including:
        an inner circumference formed so as to fitly attach to a rotary shaft;
        an outer circumference formed with engaging teeth formed parallel to the direction of the rotary shaft and a flange erected on a side of the engaging teeth, the flange having a plurality of holes formed therein extending in a direction of the rotary shaft; the plurality of through holes having different sizes or different shapes; and
    a gap retainer disposed between the pair of disks, the gap retainer having an inner circumference formed so as to fitly attach to the rotary shaft,
    wherein the teeth are configured and arranged such that, in use, both the disks simultaneously engage the toothed belt.

8. The pulley according to claim 7, wherein an outer circumference of the gap retainer is formed to be noncircular in shape.

9. The pulley according to claim 7, wherein the plurality of through holes are provided at positions corresponding to the positions of tips of the teeth formed in the outer circumference of the disks.

10. The pulley according to claim 7, wherein said plurality of through holes are provided in an alternating configuration such that a first hole is formed in a flange of a first disk corresponding to the position of a tip of an engaging tooth formed in the outer circumference of the disk with no corresponding hole being formed in the second disk, while a second hole is formed in the flange of the second disk at a position corresponding to the tip of an adjacent engaging tooth, with no corresponding second hole being formed in the flange of the first disk.

11. The pulley according to claim 7, wherein the first and second disks have substantially the same diameter as each other.

12. A pulley configured for use with a toothed belt, the pulley comprising:
    first and second disks spaced apart from each other and configured to be mounted to a rotary shaft, each of the disks including:
        an outer circumference;
        a plurality of teeth disposed about the outer circumference;

a circumferential flange disposed proximate the teeth, the flange having a plurality of through holes formed therein, the plurality of through holes having different sizes or different shapes;

wherein the teeth are configured and arranged such that, in use, both disks simultaneously engage the toothed belt.

13. The pulley according to claim 12, wherein the first and second disks have substantially the same diameter as each other.

14. The pulley according to claim 12, wherein one of the through holes has a different size or shape than another of the through holes.

15. The pulley according to claim 12, wherein, in the first disk, one or more of the through holes is provided at a position corresponding to the position of a tip of a tooth formed in the outer circumference of the first disk.

16. The pulley according to claim 12, wherein the plurality of through holes in the first disk are provided in an alternating configuration such that a first hole is formed in the flange of the first disk corresponding to the position of a tip of an engaging tooth formed in the outer circumference of the first disk with no corresponding hole being formed in the second disk, while a second hole is formed in the flange of the second disk at a position corresponding to the tip of an adjacent engaging tooth, with no corresponding second hole being formed in the flange of the first disk.

17. The pulley according to claim 12, further comprising a third disk configured to be mounted to the rotary shaft.

18. The pulley according to claim 12, further comprising a gap retainer disposed between the first and second disks, the gap retainer configured to be mounted to the rotary shaft.

19. The pulley according to claim 18, wherein a perimeter of the gap retainer is non-circular in shape.

* * * * *